(12) United States Patent
Schroers et al.

(10) Patent No.: US 11,012,718 B2
(45) Date of Patent: May 18, 2021

(54) SYSTEMS AND METHODS FOR GENERATING A LATENT SPACE RESIDUAL

(71) Applicant: Disney Enterprises, Inc., Burbank, CA (US)

(72) Inventors: Christopher Schroers, Zurich (CH); Joaquim Campos, Lausanne (CH); Abdelaziz Djelouah, Zurich (CH); Yuanyi Xue, Kensington, CA (US); Erika Varis Doggett, Los Angeles, CA (US); Jared McPhillen, Glendale, CA (US); Scott Labrozzi, Cary, NC (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/557,920

(22) Filed: Aug. 30, 2019

(65) Prior Publication Data
US 2021/0067808 A1    Mar. 4, 2021

(51) Int. Cl.
*H04N 19/91* (2014.01)
*G06K 9/00* (2006.01)
*H04N 19/12* (2014.01)
*H04N 19/124* (2014.01)
*G06N 3/08* (2006.01)

(52) U.S. Cl.
CPC ......... *H04N 19/91* (2014.11); *G06K 9/00744* (2013.01); *G06K 9/00765* (2013.01); *G06N 3/08* (2013.01); *H04N 19/12* (2014.11); *H04N 19/124* (2014.11)

(58) Field of Classification Search
CPC ...... H04N 19/91; H04N 19/12; H04N 19/124; G06K 9/00744; G06K 9/00765; G06N 3/08
See application file for complete search history.

(56) References Cited

U.S. PATENT DOCUMENTS

| | | |
|---|---|---|
| 2003/0206583 A1 | 11/2003 | Srinivasan et al. |
| 2004/0264568 A1 | 12/2004 | Florencio |

(Continued)

FOREIGN PATENT DOCUMENTS

EP    3451670 A1    3/2019

OTHER PUBLICATIONS

"End-to-End Learning of Video Compression Using Spatio-Temporal Autoencoders" ICLR, 2019, <https://openreview.net/pdf?id=HyIlasActm>.
Chen et al., "DeepCoder: A Deep Neural Network based Video Compression," School of Electronic Science and Engineering, Nanjing University, Jiangsu, China, Dec. 2017, <https://www.researchgate.net/publication/323501194_DeepCoder_A_deep_neural_network_based_video_compression>.

(Continued)

*Primary Examiner* — Joon Kwon
(74) *Attorney, Agent, or Firm* — Artegis Law Group, LLP (57) ABSTRACT

Systems and methods are disclosed for generating a latent space residual. A computer-implemented method may use a computer system that includes non-transient electronic storage, a graphical user interface, and one or more physical computer processors. The computer-implemented method may include: obtaining a target frame, obtaining a reconstructed frame, encoding the target frame into a latent space to generate a latent space target frame, encoding the reconstructed frame into the latent space to generate a latent space reconstructed frame, and generating a latent space residual based on the latent space target frame and the latent space reconstructed frame.

20 Claims, 7 Drawing Sheets

(56) References Cited

U.S. PATENT DOCUMENTS

| | | | | |
|---|---|---|---|---|
| 2011/0249747 | A1* | 10/2011 | Endo | H04N 19/521 |
| | | | | 375/240.16 |
| 2011/0280308 | A1* | 11/2011 | Oishi | H04N 19/567 |
| | | | | 375/240.16 |
| 2012/0189058 | A1* | 7/2012 | Chen | H04N 19/109 |
| | | | | 375/240.15 |
| 2015/0350509 | A1 | 12/2015 | Tico et al. | |
| 2016/0350893 | A1 | 12/2016 | Fletcher | |
| 2017/0154234 | A1* | 6/2017 | Tanaka | G06T 7/001 |
| 2017/0230675 | A1 | 8/2017 | Wierstra | |
| 2017/0237993 | A1* | 8/2017 | Kim | H04N 19/139 |
| | | | | 375/240.12 |
| 2017/0374374 | A1 | 12/2017 | Wang et al. | |
| 2018/0014022 | A1* | 1/2018 | Cho | H04N 19/167 |
| 2019/0026631 | A1 | 1/2019 | Carr | |
| 2019/0066733 | A1 | 2/2019 | Somanath et al. | |
| 2019/0373264 | A1* | 12/2019 | Chong | H04N 19/13 |
| 2020/0244969 | A1* | 7/2020 | Bhorkar | H04N 19/147 |

OTHER PUBLICATIONS

Lu et al., "DVC: An End-to-end Deep Video Compression Framework," Shanghai Jiao Tong University; the University of Sydney; the University of Sydney, Sense Time Computer Vision Research Group, Dec. 14, 2018, <https://arxiv.org/pdf/1812.00101.pdf>.

Kin et al., "Video Compression Using Recurrent Convolutional Neural Networks," Electrical Engineering Computer Science, 2017, <http://cs231n.stanford.edu/reports/2017/pdfs/423.pdf>.

Despois, "Latent space visualization—Deep Learning bits," Deep Learning Engineer @ L'Oréal, Feb. 24, 2017, <https://hackernoon.com/latent-space-visualization-deep-learning-bits-2-bd09a46920df>.

Non-Final Office Action received for U.S. Appl. No. 16/556,083, dated Jun. 19, 2020, 11 pages.

Notice of Allowance received for U.S. Appl. No. 16/556,083 dated Dec. 9, 2020, 9 pages.

* cited by examiner

SYSTEMS AND METHODS FOR GENERATING A LATENT SPACE RESIDUAL

TECHNICAL FIELD

The present disclosure relates generally to encoders and decoders.

BRIEF SUMMARY OF THE DISCLOSURE

Embodiments of the disclosure are directed to systems and methods for generating a latent space residual. In one embodiment, a computer-implemented method may include obtaining, from a non-transient electronic storage, a target frame. The computer-implemented method may also include obtaining, from the non-transient electronic storage, a reconstructed frame. The reconstructed frame may be based on surrounding reference frames. The computer-implemented method may further include encoding, with a physical computer processor, the target frame into a latent space to generate a latent space target frame. The computer-implemented method may also include encoding, with the physical computer processor, the reconstructed frame into the latent space to generate a latent space reconstructed frame. The computer-implemented method may further include generating, with the physical computer processor, a latent space residual based on the latent space target frame and the latent space reconstructed frame.

In embodiments, the computer-implemented method may include decoding, with the physical computer processor, the latent space residual and the latent space reconstructed frame to generate a decoded target frame.

In embodiments, the reconstructed frames may be generated by a number of steps. One step may include obtaining, from the non-transient electronic storage, one or more reference frames. Another step may include encoding, with the physical computer processor, the one or more reference frames. Yet another step may include decoding, with the physical computer processor, the one or more reference frames to generate one or more decoded reference frames. Another step may include predicting, with the physical computer processor, a reconstructed frame based on the one or more decoded reference frames.

In embodiments, encoding the target frame and the reconstructed frame may map the target frame and the reconstructed frame from an image space to a latent space.

In embodiments, the latent space residual and the latent space reconstructed frame may be quantized in the latent space.

In embodiments, the latent space residual and the latent space reconstructed frame may be entropy coded.

In another embodiment, a computer-implemented method may be disclosed. The computer-implemented method may include obtaining, from a non-transient electronic storage, a target frame. The computer-implemented method may also include obtaining, from the non-transient electronic storage, one or more reference frames surrounding the target frame. The computer-implemented method may further include obtaining, from the non-transient electronic storage, an image transformative model. The image transformative model may include an encoder and a decoder. The computer-implemented method may further include applying, with the physical computer processor, the one or more reference frames to the image transformative model to generate one or more decoded reference frames. The computer-implemented method may further include predicting, with the physical computer processor, a reconstructed frame corresponding to the target frame based on the one or more decoded reference frames. The computer-implemented method may also include applying, with the physical computer processor, the target frame to the encoder to generate a latent space target frame. The computer-implemented method may further include applying, with the physical computer processor, the reconstructed frame to the encoder to generate a latent space reconstructed frame. The computer-implemented method may further include generating, with the physical computer processor, a latent space residual based on the latent space target frame and the latent space reconstructed frame.

In embodiments, the computer-implemented method may include applying, with the physical computer processor, the latent space residual and the latent space reconstructed frame to the decoder to generate a decoded target frame.

In embodiments, the encoder may map an image space to a latent space.

In embodiments, the decoder may map a latent space to an image space.

In embodiments, the image transformative model may be based on a neural network.

In embodiments, the latent space residual and the latent space reconstructed frame may be quantized in the latent space.

In embodiments, the latent space residual and the latent space reconstructed frame may be entropy coded.

In another embodiment, a system for generating a latent space residual may be disclosed. The system may include a non-transient electronic storage. The system may also include a physical computer processor configured by machine-readable instructions to perform a number of operations. One operation may include obtaining a target frame. Another operation may include obtaining a reconstructed frame. The reconstructed frame may be based on surrounding reference frames. Another operation may include encoding the target frame into a latent space to generate a latent space target frame. Yet another operation may include encoding the reconstructed frame into the latent space to generate a latent space reconstructed frame. Another operation may include generating a latent space residual based on the latent space target frame and the latent space reconstructed frame.

In embodiments, the physical computer processor may be further configured by machine-readable instructions to decode the latent space residual and the latent space reconstructed frame to generate a decoded target frame.

In embodiments, the physical computer processor may be further configured by machine-readable instructions to display, via a graphical user interface, the decoded target frame.

In embodiments, the reconstructed frames may be generated by a number of operations. One operation may include obtaining one or more reference frames. Another operation may include encoding the one or more reference frames. Another operation may include decoding the one or more reference frames to generate one or more decoded reference frames. Yet another operation may include predicting a reconstructed frame based on the one or more decoded reference frames.

In embodiments, encoding the target frame and the reconstructed frame may map the target frame and the reconstructed frame from an image space to a latent space.

In embodiments, the latent space residual and the latent space reconstructed frame may be quantized in the latent space.

In embodiments, the latent space residual and the latent space reconstructed frame may be entropy coded.

Other features and aspects of the disclosed technology will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

Further aspects of the present disclosure will be more readily appreciated upon review of the detailed description of the various disclosed embodiments, described below, when taken in conjunction with the accompanying figures.

The figures are described in greater detail in the description and examples below are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Video content represents a majority of the total internet traffic and the amount of traffic is expected to increase as spatial resolution frame rate, color depth of videos, and the number of users on video streaming services increase. One area where efficiency can be improved is through the encoding and decoding processes, which can be computationally intensive. For example, the presently disclosed technology may relate to compression that finds an optimal encoding and/or decoding function to improve the rate distortion performance.

Various embodiments of the present disclosure are directed to systems and methods for generating a latent space residual. The latent space residual may be based on one or more frames from target content. In embodiments, a reconstructed frame and a corresponding target frame may be encoded from an image space into a latent space. The target frame may be the original frame the reconstructed frame is based on. The reconstructed frame may be reconstructed using methods described in U.S. patent application Ser. No. 16/556,083, which is incorporated herein by reference in its entirety. The latent space reconstruction frame and the latent space target frame may be used to generate a latent space residual. The latent space residual and the latent space reconstruction frame may be decoded to generate a decoded target frame.

As used herein, latent space may refer to a space into which content is encoded. The content in the latent space may be referred to as a latent space representation of the content. For example, latent space may be content that has been encoded and/or quantized into content and/or features. Image space may refer to an actual image and different portions of that image (e.g., position on the image, RGB, CMYK, and/or other portions of the image). A latent space residual may refer to a difference between two latent space representations. For example, a first latent space representation may be of a first image and a second latent space representation may be of a second image immediately subsequent to the first image. A latent space residual between the two might be the difference between the first latent representation and the second latent representation. Residual may refer to a difference between two values. An error may refer to a visually noticeable error, an error about a threshold value, a distortion error, etc. As used herein, a frame may be a frame of a video sequence or other visual content. As used herein, a target frame may be a frame that is to be reconstructed. As used herein, a reference frame may be an adjacent frame or a frame nearby the target frame. As used herein, interpolation may be used to refer to reconstruction, which in turn may refer to assembling, piecing together, estimating, predicting, or otherwise generating a frame based on encoded data. As used herein, a reconstructed reference frame and/or a reconstructed target frame may refer to a decoded reference frame and/or a target frame, respectively, that is reconstructed using the methods described in U.S. patent application Ser. No. 16/556,083.

Figure 1:
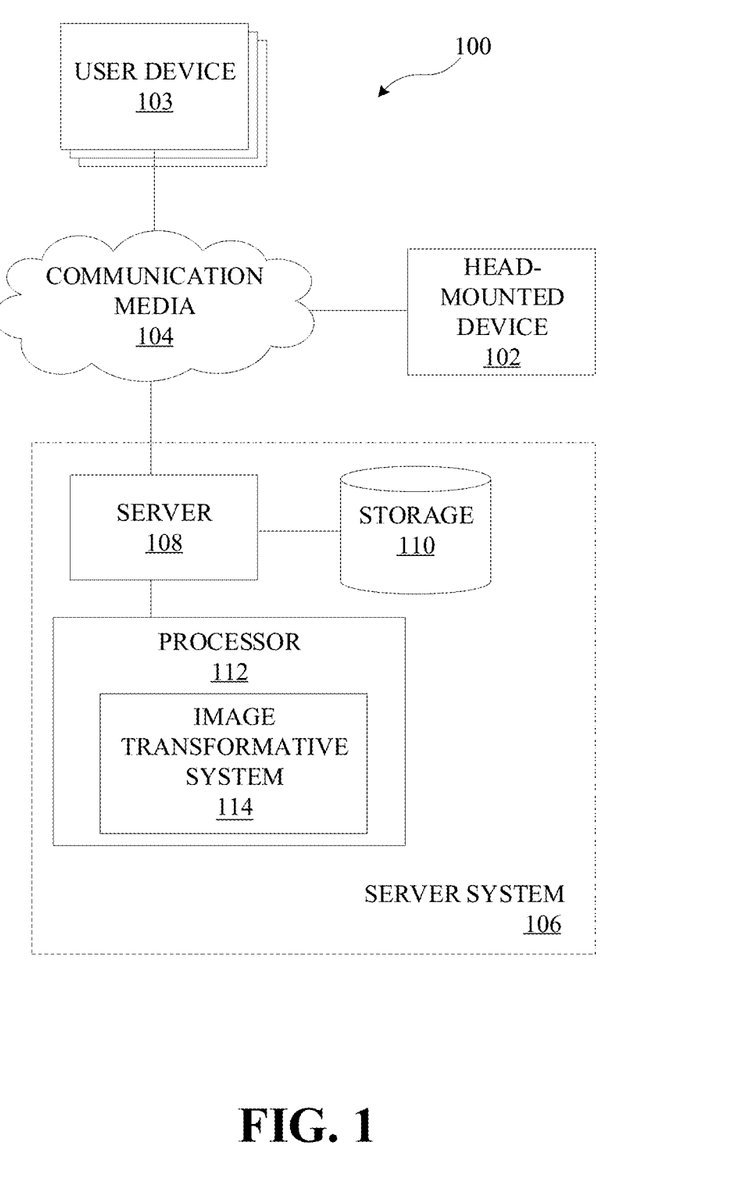
FIG. 1 illustrates an example system for generating a latent space residual, in accordance with various embodiments.

Before describing the technology in detail, an example environment in which the presently disclosed technology can be implemented will be described. FIG. 1 illustrates one such example environment 100.

Environment 100 may be used in connection with implementing embodiments of the disclosed systems, methods, and devices. By way of example, the various below-described components of FIG. 1 may be used to generate a latent space residual. The latent space residual may be generated from one or more frames of target content. Content may include different types of media content, such as, for example, videos, images, and/or other visual content. Content may come in various resolutions, such as standard, high definition (HD), ultra HD (UHD), 4 k UHD, 8 k UHD, and/or other resolutions. Content may include one or more frames. A reconstructed frame may be derived from interpolation, prediction, compression, decoding, and/or other reconstruction techniques. The reconstructed frame may include distortions, artifacts and/or other modifications that result from the above interpolation, prediction, compression, decoding, reconstruction, modification, alteration, etc. to the target content. Server system 106 may include image transformative model 114, as will be described herein. Image transformative model 114 may map content from an image space representation to a latent space representation, may generate latent space representations from other latent space representations, and/or may map content from the latent space representation to the image space representation. This may be accomplished using autoencoders, neural compression networks, and/or other encoder-decoder networks.

Image transformative model 114 may include an encoder and a decoder. The encoder may predict, transform, and/or encode target content. The encoder may predict pixels based on previously-encoded pixels in a frame (e.g., intra prediction), or on previously-encoded frames (e.g., inter prediction). Image transformative model 114 in FIG. 1 may include a machine-learning-based encoder (e.g., a neural-network-based encoder), a block-based encoder, and/or other encoders. The encoder may include one or more convolutional layers, one or more quantization layers, one or more normalization layers, one or more activation functions, one or more latent spaces, one or more lossless encoders, one or more entropy encoders, and/or other components. Though not illustrated, it should be appreciated that a communication system may be implemented in image transformative model 114 to transmit content from/to the encoder to/from the decoder.

The decoder may decode, inverse transform, and/or reconstruct the target content. The decoder may include a machine-learning-based decoder (e.g., a neural-network-based decoder), a block-based decoder, and/or other decoders. The decoder may include one or more entropy decoders, one or more lossless decoders, one or more deconvolutional layers, one or more inverse normalization layers, one or more image spaces, and/or other components. It should be appreciated that the presently disclosed technology allows for various encoders and decoders to be used that may be selected on a particular application.

Figure 2:
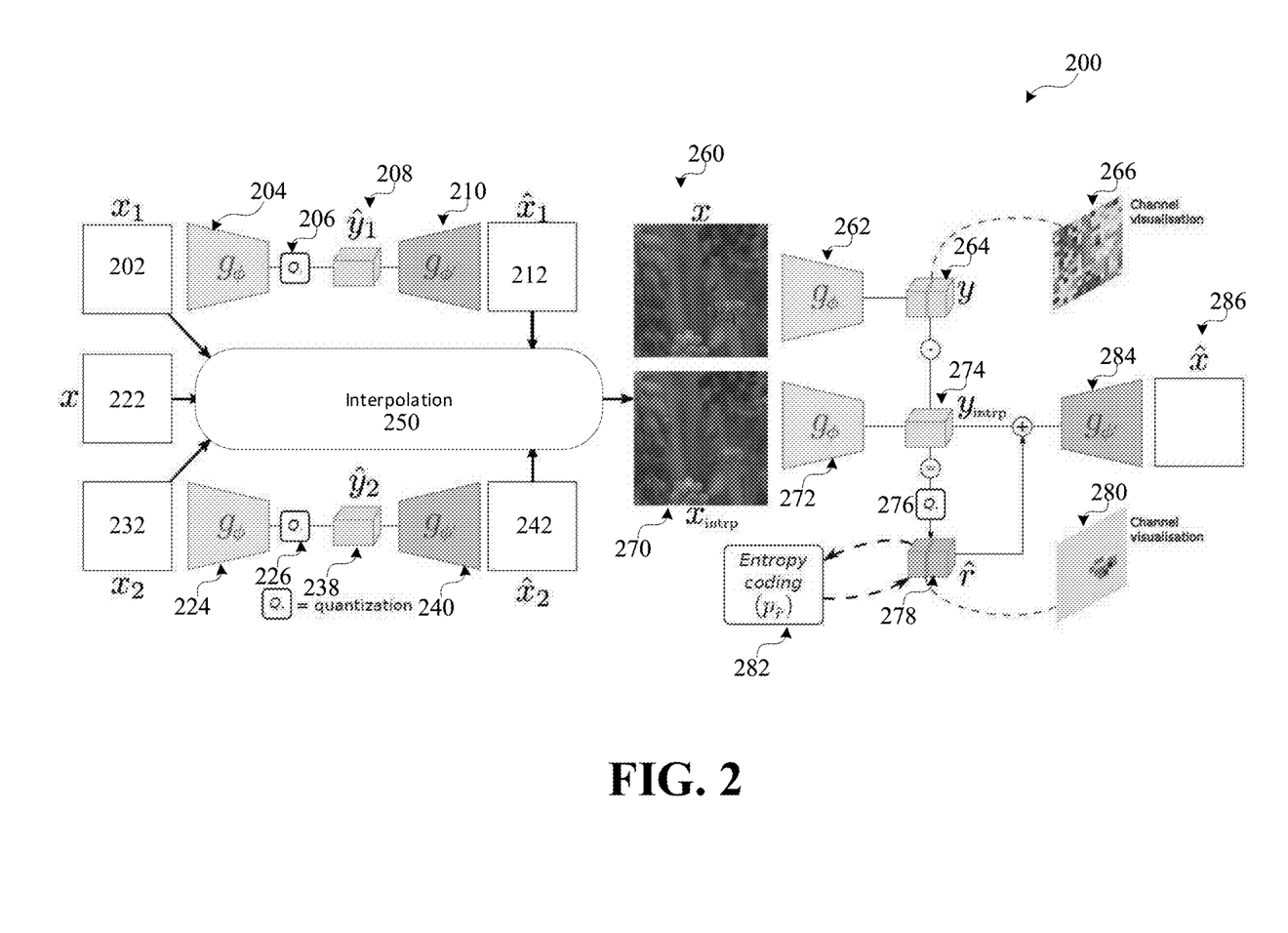
FIG. 2 illustrates an example pipeline used to generate a latent space residual, in accordance with embodiments of the disclosed technology.

In embodiments, image transformative model 114 may be used in a pipeline to generate a latent space residual. FIG. 2 illustrates an example pipeline 200 used to generate a latent space residual, in accordance with embodiments of the disclosed technology. Pipeline 200 may be used when a reconstructed frame includes visually noticeable errors which can be reduced by using a residual between the reconstructed frame and its corresponding target frame.

As illustrated, reference frame 202 and reference frame 232 may be obtained. A reference frame may include one or more frames surrounding a target frame. One or more frames surrounding a target frame may be frames sequentially just before or just after the target frame 222 in a video sequence of images. In embodiments, the one or more frames surrounding a target frame may be frames separated by one or more frames from the target frame. It should be appreciated that different intervals between the reference frames 202 and 232 and the target frame 222 could be appropriate for different applications. For example, the interval could be 5, 20, 50, and so on.

Target frame 222 may also be obtained. A target frame may be the frame to be compressed and/or decompressed. Reference frame 202 may be encoded through encoder 204. $g_\phi$ may represent an encoder, such as encoder 204. For example, the encoder may include five blocks. Each block may include a convolutional layer and a Generalized Normalization Transformation (GDN) layer. The convolutional layers may have a kernel size, k, of about 5 and a stride, s, of about 2. The encoded reference frame may be quantized via quantization 206. Quantization may round or otherwise limit the values of any data into a smaller subset of values.

Latent space reference frame 208 may be decoded by decoder 210 to generate decoded reference frame 212. $g_\phi$, may represent a decoder, such as decoder 210. For example, the decoder may be architecturally similar to the encoder and include five blocks. Individual blocks may include upsampled convolutions (k may be about 5 and s may be about 2) and an inverse GDN layer. The decoder may include three output channels, which may correspond to an RGB image.

In one example, encoder 204 and decoder 210 may be part of an autoencoder. Reference frame 232 may go through substantially the same process, as described above for reference frame 202. One or more of reference frame 202, target frame 222, reference frame 232, decoded reference frame 212, and decoded reference frame 242 may be used as input for reconstruction 250, which is described in greater detail in U.S. patent application Ser. No. 16/556,083. It should be appreciated that encoder 204, quantizer 206, latent space 208, and decoder 210 may be the same as encoder 324, quantization 326, latent space 238, and decoder 240, respectively. In embodiments, encoder 204 and encoder 224 may encode frames using an image compression strategy. For example, the image compression strategy may use machine learning (e.g., U.S. patent application Ser. Nos. 16/167,388, 16/249,861, 16/254,475, and 16/261,441 which are hereby incorporated by reference herein in their entirety) or other image and/or video compression strategies.

An interpolated frame, or reconstructed frame 270, may be encoded by encoder 272 into latent space reconstructed frame 274. Similarly, target frame 260, which may correspond to target frame 222 (e.g., they may be the same frame), may be encoded by encoder 262 into a latent space target frame 264. A visualization of a latent space target frame channel may be illustrated by 266. Another example of a latent space channel is further illustrated in FIGS. 5 and 8, described herein. In latent space, latent space reconstructed frame 274 may be subtracted from latent space target frame 264 to generate latent space residual 278. In equation form, $r = y - y_{recon} = g_\phi(x) - g_\phi(x_{recon})$, where r may represent the residual, y may represent latent space target frame 264, $y_{recon}$ may represent latent space reconstructed frame 274, $g_\phi$ may represent an encoder, x may represent target frame 260, and $x_{recon}$ may represent reconstructed frame 270. In some embodiments, latent space residual 278 may be quantized via quantization 276. A visualization of a latent space residual channel may be illustrated by 280. Another example of a latent space residual channel is further illustrated in FIG. 8, described herein.

Latent space residual 278 may be entropy coded by 282 based on one or more probability models. For example, the probability model may include a non-parametric fully factorized model and/or more complex models. In one example, the probability model may be $$p\hat{y} \sim p\tilde{y} \mid \psi = \prod_c p\tilde{y}_c \mid \psi^{(c)}(\tilde{y}_c \mid \psi^{(c)})$$

$$p\hat{r} \sim p\tilde{r} \mid \psi_r = \prod_c p\tilde{r}_c \mid \psi^{(c)}(\tilde{r}_c \mid \psi^{(c)})$$

where $p_{\tilde{y}}$ may represent probability values of a quantized latent space target frame, $p_{\tilde{r}}$ may represent probability values of the latent space residual, and $\psi^{(c)}$ may represent the parameters of the distributions that are used to describe the probabilities of latent variables. The parameters, $\psi^{(c)}$, may be estimated separately for each channel, c, in the latent space so that each channel can have a different probability model. This distribution can, for example, be a non-parametric piecewise linear density model used to describe the probabilities of latent variables. Overall, a probability model is used for entropy coding, i.e. to losslessly compress the discrete latent variables into a compact bit stream.

In another example, the probability model may be $$p_{\tilde{y}} \sim p_{\tilde{y}}(\tilde{y}|\tilde{z}, \theta_{hd}, \theta_{cm}, \theta_{ep})$$

$$p_{\tilde{r}} \sim p_{\tilde{r}}(\tilde{r}|\tilde{z}_r, \theta_{hd}, \theta_{cm}, \theta_{ep})$$

where $\tilde{z}$ may represent the hyper prior latent variables which may be transmitted as side information next to the latent variables themselves (e.g., the hyper prior latent variables may be taken into account by the hyperparameter decoder network to describe the probabilities of the actual latents. The data to transmit the hyper prior latents, which themselves are entropy coded with a fully factorized model, may be less than the savings due to having a better probability model for the latents. It may be worth it to transmit this additional data). $\theta_{hd}$ may represent a hyper-parameter decoder network, $\theta_{cm}$ may represent a context model network, $\theta_{ep}$ may represent a fully-factorized model, and the other variables may be the same as the above example probability model. In embodiments, probability models may be used to model entropy coding for latent space images, latent space residuals, and/or motion information. The probability model may include distributions modeled as Gaussians that may be predicted from hyper-parameters and a context model network. It should be appreciated that other probability models may be used to train the encoder and decoder.

After entropy coding, latent space residual 278 and latent space reconstructed frame 274 may be combined as input for decoder 284 to generate decoded target frame 286. In equation form, $\hat{x} = g_{\phi'}(y_{recon} + \hat{r})$ where $\hat{x}$ may represent decoded target frame 286, $g_{\phi'}$ may represent a decoder, $y_{recon}$ may represent latent space reconstructed frame 274, and r may represent latent space residual 278 that has been quantized.

It should be appreciated that encoder 262 and 272 may be the same encoder. Similarly, it should be appreciated that encoder 204, encoder 224, encoder 262, and encoder 272 may be the same encoder and that decoder 210, decoder 240, and decoder 284 may be the same decoder. It should also be appreciated that using the same encoder and decoder throughout pipeline 200 may allow for easy reconfiguration by swapping out encoder-decoder pairs for a particular application while exploiting the advantages of a given encoder-decoder pair. For example, using the same encoder and decoder throughout pipeline 200 may reduce the number of parameters to optimize and track, while making the reconstruction quality the same for reference frames, reconstructed frames, and/or decoded frames. By using the same encoder and decoder, the reference frame quality levels may not need to be adjusted after the latent space residual is generated because the reconstruction quality for the decoded reference frames and the decoded target frame may be the same.

Moreover, training the image transformative model with training content may be simplified when the same image transformative model (which may be referred to as an encoder-decoder) are used throughout pipeline 200. In one example, training content may include a septuplets data set. A random sample of triplets may be selected with various intervals of one, two, or three. The mean squared error may be used as image distortion loss d, as used in the equation below. Different rate-distortion ratios may be achieved by training with different weights $\lambda_{recon}$ and $\lambda_{img}$. In embodiments, independent uniform noise may be added to approximate quantization performed after encoding target content. For example, the independent uniform noise may be added to latent space values during training. The image transformative model may be trained based on one or more parameters, which may include rate-distortion, bit-rate, quality level, efficiency, etc. For example, the encoder and decoder may jointly optimize the rate-distortion objective function for reference frames 202 and 232 and latent space residual 278 together:

$$\Lambda^*_{img} = \arg\min_{\Lambda_{img}}$$

$$\mathbb{E}_{x \sim P_x}\left[-\log_2 p_{\tilde{r}}(\hat{r}) + \lambda_{img}d(x, \hat{x}) + \sum_{i=1}^{2}\frac{1}{2}(-\log_2 p_{\tilde{y}}(\hat{y}i) + \lambda_{img}d(x_i, \hat{x}_i))\right]$$

where $\Lambda = \{\phi, \phi', p_{\tilde{y}}, p_{\tilde{r}}\}$, which may represent the learned parameters, $-\log_2 p_{\tilde{r}}(\hat{r}) + \lambda_{img}d(x, \hat{x})$ may correspond to the residual rate-distortion objective function, and $$\sum_{i=1}^{2}\frac{1}{2}(-\log_2 p_{\tilde{y}}(\hat{y}i) + \lambda_{img}d(x_i, \hat{x}_i))$$

may correspond to the reference frame rate distortion objection function.

In another example, an optimal inter-frame compression strategy for a fixed target quality may achieve the lowest bit-rate for reconstructed and/or decoded frames, while having a perceptually similar quality as the reference frames. In embodiments, where the image compression network for the reference frames may also be used for the residuals in the inter-frame compression block, the final reconstructed and/or decoded image quality may be similar. The quality may be determined by training the image compression network for a particular value of $\lambda_{img}$ in the loss function above with $\Lambda$. In this case, the degree of freedom may come from selecting $\lambda_{recon}$ for the interpolation autoencoder, as described in U.S. patent application Ser. No. 16/556,083. For example, by choosing a lower quality for the interpolation the bit-rate may be largely reduced but this could negatively impact the bit-rate for the residual. On the opposite end, choosing a higher quality for the interpolation may not be ideal either, as large motion can be present, such that interpolation may be difficult and allocating more bits to encode the residuals may be optimal.

The optimal strategy may be determined by comparing multiple, different interpolation configurations at test time and using one of the multiple, different interpolation configurations that results in the lowest total bitrate after residual computation. In some embodiments, the networks, or pipelines, may be trained independently. The reconstruction pipeline, described in U.S. patent application Ser. No. 16/556,083, may be trained first for different $\lambda_{recon}$ values in the loss function and using ground truth images. The image compression pipeline may be trained afterwards, using one of the obtained interpolation models and keeping its parameters fixed.

Referring back to FIG. 1, electronic device 102 may include a variety of electronic computing devices, such as, for example, a smartphone, tablet, laptop, computer, wearable device, television, virtual reality device, augmented reality device, displays, connected home device, Internet of Things (IOT) device, smart speaker, and/or other devices. Electronic device 102 may present content to a user and/or receive requests to send content to another user. In some embodiments, electronic device 102 may apply image transformative model 114 to target content. In embodiments, electronic device 102 may store image transformative model 114.

As shown in FIG. 1, environment 100 may include one or more of electronic device 102 and server system 106. Electronic device 102 can be coupled to server system 106 via communication media 104. As will be described in detail herein, electronic device 102 and/or server system 106 may exchange communications signals, including content, metadata, quality levels, quantization step sizes, user input, encoders, decoders, latent space representations, residuals, difference maps, security and encryption information, and/or other information via communication media 104.

In various embodiments, communication media 104 may be based on one or more wireless communication protocols such as Wi-Fi, Bluetooth®, ZigBee, 802.11 protocols, Infrared (IR), Radio Frequency (RF), 2G, 3G, 4G, 5G, etc., and/or wired protocols and media. Communication media 104 may be implemented as a single medium in some cases.

As mentioned above, communication media 104 may be used to connect or communicatively couple electronic device 102 and/or server system 106 to one another or to a network, and communication media 104 may be implemented in a variety of forms. For example, communication media 104 may include an Internet connection, such as a local area network (LAN), a wide area network (WAN), a fiber optic network, internet over power lines, a hard-wired connection (e.g., a bus), and the like, or any other kind of network connection. Communication media 104 may be implemented using any combination of routers, cables, modems, switches, fiber optics, wires, radio (e.g., microwave/RF links), and the like. Upon reading the present disclosure, it should be appreciated that other ways may be used to implement communication media 104 for communications purposes.

Likewise, it will be appreciated that a similar communication medium may be used to connect or communicatively couple server 108, storage 110, processor 112, and/or image transformative model 114 to one another in addition to other elements of environment 100. In example implementations, communication media 104 may be, or include, a wired or wireless wide area network (e.g., cellular, fiber, and/or circuit-switched connection, etc.) for electronic device 102 and/or server system 106, which may be relatively geographically disparate; and in some cases, aspects of communication media 104 may involve a wired or wireless local area network (e.g., Wi-Fi, Bluetooth, unlicensed wireless connection, USB, HDMI, standard AV, etc.), which may be used to communicatively couple aspects of environment 100 that may be relatively close geographically.

Server system 106 may provide, receive, collect, or monitor information to/from electronic device 102, such as, for example, content, metadata, quality levels, quantization step sizes, user input, encoders, decoders, latent space representations, residuals, difference maps, security and encryption information, and the like. Server system 106 may be configured to receive or send such information via communication media 104. This information may be stored in storage 110 and may be processed using processor 112. For example, processor 112 may include an analytics engine capable of performing analytics on information that server system 106 has collected, received, etc. from electronic device 102. Processor 112 may include image transformative model 114 capable of receiving target content, analyzing target content, compressing target content, encoding target content, quantizing target content, convolving target content, deconvolving target content, decoding target content, decompressing target content, and otherwise processing content and generating a latent space residual that server system 106 has collected, received, etc. based on requests from, or coming from, electronic device 102. In embodiments, server 108, storage 110, and/or processor 112 may be implemented as a distributed computing network, a relational database, or the like.

Server 108 may include, for example, an Internet server, a router, a desktop or laptop computer, a smartphone, a tablet, a processor, a component, or the like, and may be implemented in various forms, including, for example, in an integrated circuit or collection thereof, in a printed circuit board or collection thereof, or in a discrete housing/package/rack or multiple of the same. Server 108 may update information stored on electronic device 102. Server 108 may send/receive information to/from electronic device 102 in real-time or sporadically. Further, server 108 may implement cloud computing capabilities for electronic device 102. Upon studying the present disclosure, one of skill in the art will appreciate that environment 100 may include multiple electronic devices 102, communication media 104, server systems 106, servers 108, storage 110, processors 112, and/or image transformative model 114.

Figure 3:
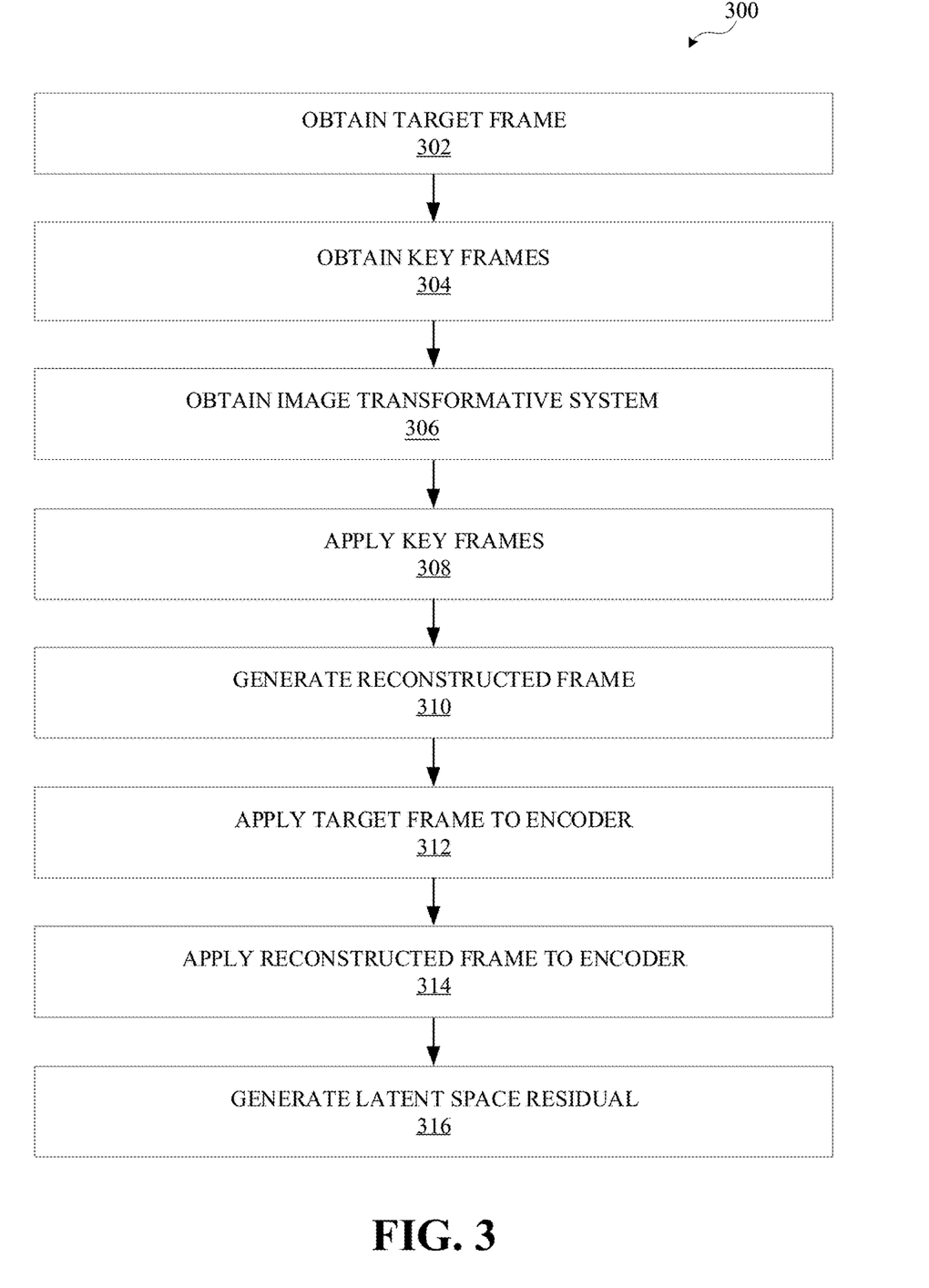
FIG. 3 is an operational flow diagram illustrating an example process for generating a latent space residual, in accordance with one embodiment.

FIG. 3 is an operational flow diagram illustrating an example process for generating a latent space residual, in accordance with one embodiment. The operations of the various methods described herein are not necessarily limited to the order described or shown in the figures, and it should be appreciated, upon studying the present disclosure, that variations of the order of the operations described herein are within the spirit and scope of the disclosure.

The operations and sub-operations of the flow diagram may be carried out, in some cases, by one or more of the components, elements, devices, components, and circuitry of system 100. This may include one or more of: server system 106; server 108; processor 112; storage 110; and/or computing component 1400, described herein and referenced with respect to at least FIGS. 1 and 14, as well as subcomponents, elements, devices, components, and circuitry depicted therein and/or described with respect thereto. In such instances, the description of the flow diagram may refer to a corresponding component, element, etc., but regardless of whether an explicit reference is made, it will be appreciated, upon studying the present disclosure, when the corresponding component, element, etc. may be used. Further, it will be appreciated that such references do not necessarily limit the described methods to the particular component, element, etc. referred to. Thus, it will be appreciated that aspects and features described above in connection with (sub-) components, elements, devices, circuitry, etc., including variations thereof, may be applied to the various operations described in connection with the flow diagram without departing from the scope of the present disclosure.

At operation 302, a target frame may be obtained. For example, the target frame may be a frame of a video.

At operation 304, one or more reference frames may be obtained. The one or more reference frames may surround the target frame. In some embodiments, the reference frames may be more than one frame away from the target frame. In embodiments, a reference frame may be a decoded frame, a reconstructed frame, and/or another type of frame.

At operation 306, an image transformative model may be obtained. The image transformative model may include an encoder and a decoder, as described above. For example, the image transformative model may be based on a neural network that is trained to jointly optimize a rate-distortion objective function for the one or more reference frames and a residual.

At operation 308, the one or more reference frames may be applied to the image transformative model. The one or more reference frames may be encoded and quantized into a latent space representation. The latent space representation may be decoded to generate one or more decoded reference frames.

At operation 310, a reconstructed frame may be generated. The one or more decoded reference frames may be used to predict a reconstructed frame, which is described in greater detail in U.S. patent application Ser. No. 16/556,083.

At operation 312, the target frame may be applied to the encoder of the image transformative model. The encoder may map the image space of the target frame to a latent space, generating a latent space target frame. In embodiments, the latent space target frame may be quantized. For example, the values representing the latent space target frame may be converted into smaller set of discrete values. In embodiments, this may be accomplished by rounding the values according to a discrete finite set of values (e.g., integer values). In some embodiments, quantization may include dividing each value by an integer value. Existing quantization schemes may include DCT or DWT.

At operation 314, the reconstructed frame may be applied to the encoder. The encoder may map the image space of the reconstructed frame to a latent space, generating a latent space reconstructed frame. In embodiments, the latent space reconstructed frame may be quantized.

At operation 316, a latent space residual may be generated. The latent space residual may be based on the latent space reconstructed frame and the latent space target frame. For example, the latent space residual may be the difference in individual values between the values of the latent space target frame and the values of the latent space reconstructed frame. In embodiments, the latent space residual may be entropy coded based on a probability model. In some embodiments, the latent space residual and the latent space reconstructed frame may be combined as input for decoder of the image transformative model. The combination may be decoded into a decoded target frame.

Figure 4:
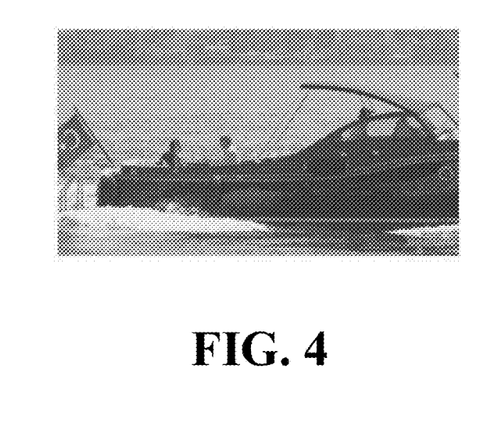
FIG. 4 illustrates an example frame, in accordance with one embodiment.
Figure 5:
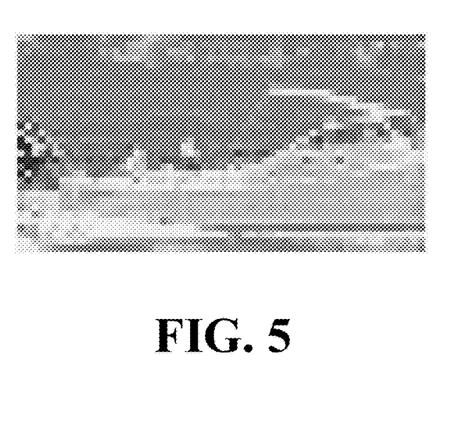
FIG. 5 illustrates an example quantized latent space frame, in accordance with one embodiment.
Figure 6:
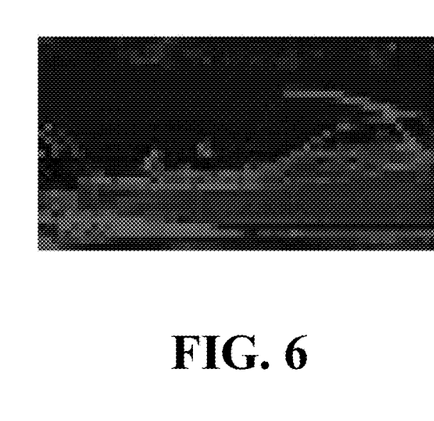
FIG. 6 illustrates an example probability corresponding to the latent space frame, in accordance with one embodiment.

FIGS. 4, 5, and 6 may correspond to a reference frame compression scenario. As illustrated, an input image, FIG. 4, may be mapped to a latent representation that is quantized into the representation of FIG. 5.

FIG. 5 illustrates an example latent space frame, in accordance with one embodiment. A channel of the latent space representation is illustrated. The values may be represented by a temperature map.

FIG. 6 illustrates an example probability corresponding to the latent space target frame, in accordance with one embodiment. A channel of the probability model corresponding to the latent space target frame is illustrated. The probabilities may be represented in gray-scale.

Figure 7:
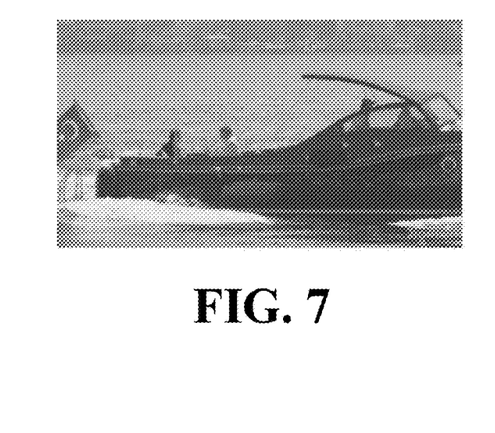
FIG. 7 illustrates an example reconstructed frame, in accordance with one embodiment.
Figure 8:
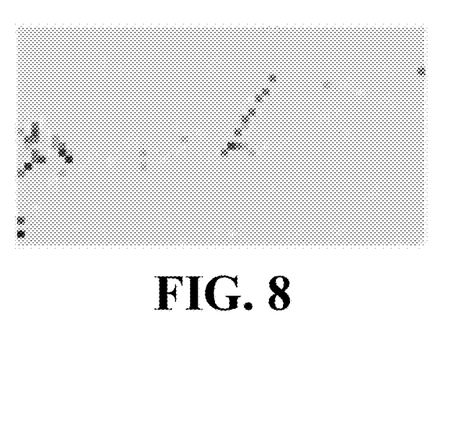
FIG. 8 illustrates an example latent space residual, in accordance with one embodiment.
Figure 9:
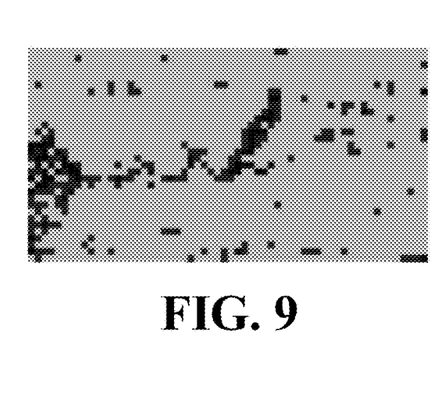
FIG. 9 illustrates an example probability corresponding to the latent space residual, in accordance with one embodiment.

FIGS. 7, 8, and 9 may correspond to a reconstructed frame that may include a few errors compared to a target frame. FIG. 7 illustrates an example reconstructed frame, in accordance with one embodiment. The reconstructed frame has a few errors that may not be very visually noticeable in the image space.

FIG. 8 illustrates an example latent space residual, in accordance with one embodiment. In the latent space, the errors may be more distinct, represented by the different shades in the frame. The values may be represented by a temperature map. As illustrated, the range of values of FIG. 8 may be smaller than the range of values of FIG. 5, indicating that a much lower entropy may be achieved, allowing more efficient encoding.

FIG. 9 illustrates an example probability corresponding to the latent space residual, in accordance with one embodiment. The probabilities may be represented in gray-scale. As illustrated, the errors are further highlighted using darker shades.

Figure 10:
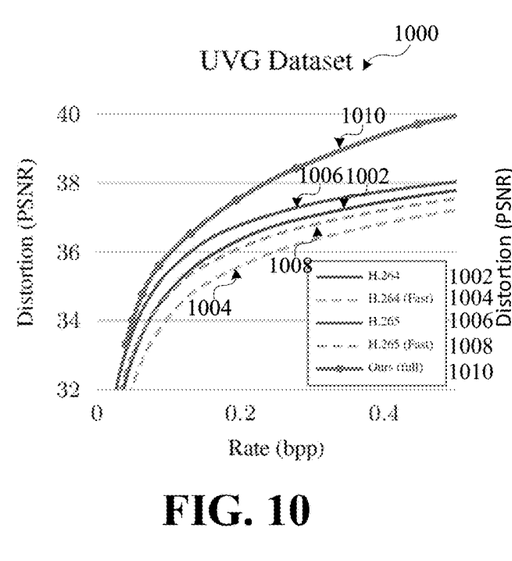
FIG. 10 illustrates distortion results of various compression systems, in accordance with one embodiment.

FIG. 10 illustrates distortion results of various compression systems, in accordance with one embodiment. As illustrated in graph 1000, the presently disclosed technology, represented by line 1010, has the greatest PSNR over most bits per pixel (BPP) rates compared to H.264 (represented by line 1002), H.264 fast (represented by line 1004), H.265 (represented by line 1006), and H.265 fast (represented by line 1008). The test results as shown are for a compression test using a reference frame interval of about 12 frames on the UVG dataset.

Figure 11:
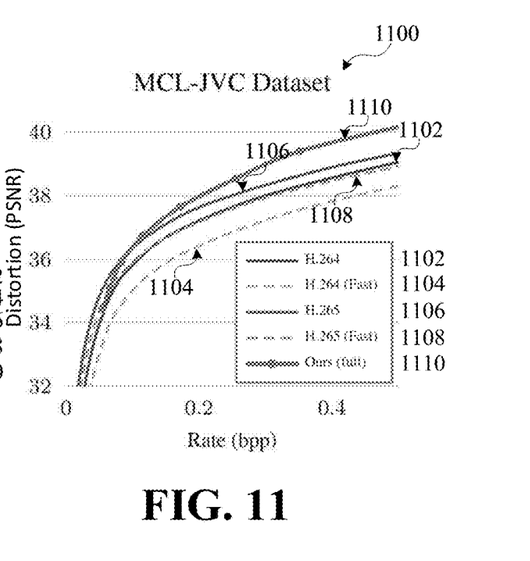
FIG. 11 illustrates distortion results of various compression systems, in accordance with one embodiment.

FIG. 11 illustrates distortion results of various compression systems, in accordance with one embodiment. As illustrated in graph 1100, the presently disclosed technology, represented by line 1110, has the greatest PSNR over most BPP rates compared to H.264 (represented by line 1102), H.264 fast (represented by line 1104), H.265 (represented by line 1106), and H.265 fast (represented by line 1108). The presently disclosed technology may perform similarly up to about 0.1 bpp and outperform the other existing technologies above about 0.1 bpp. The test may be similar to the test run in FIG. 10, except it uses the MCL-JVC dataset.

Figure 12:
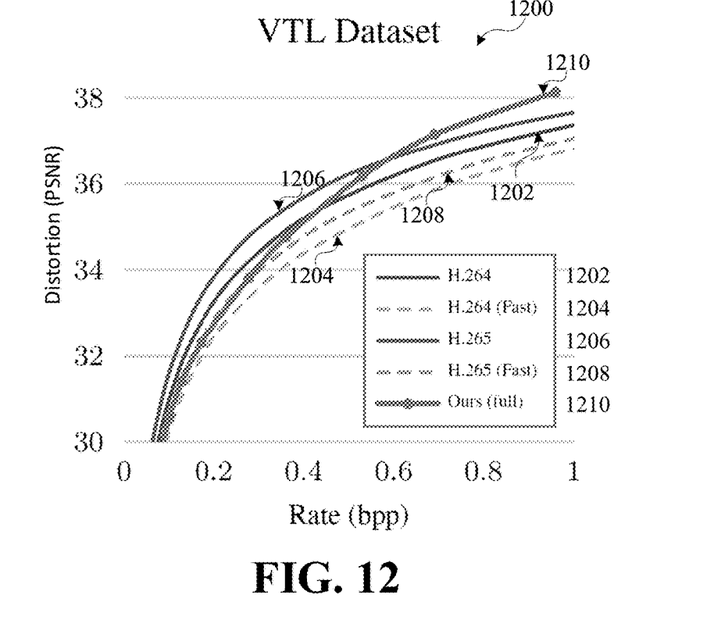
FIG. 12 illustrates distortion results of various compression systems, in accordance with one embodiment.

FIG. 12 illustrates distortion results of various compression systems, in accordance with one embodiment. As illustrated in graph 1200, the presently disclosed technology, represented by line 1210, has the greatest PSNR at the higher BPP rates compared to H.264 (represented by line 1202), H.264 fast (represented by line 1204), H.265 (represented by line 1206), and H.265 fast (represented by line 1208). The presently disclosed technology may outperform the other existing technologies above about 0.6 bpp. The test may be similar to the test run in FIG. 10, except it uses the VTL dataset. While PSNR is used in these figures, other metrics may be used in tandem with this technology to ascertain a frame or frame set's quality.

Figure 13:
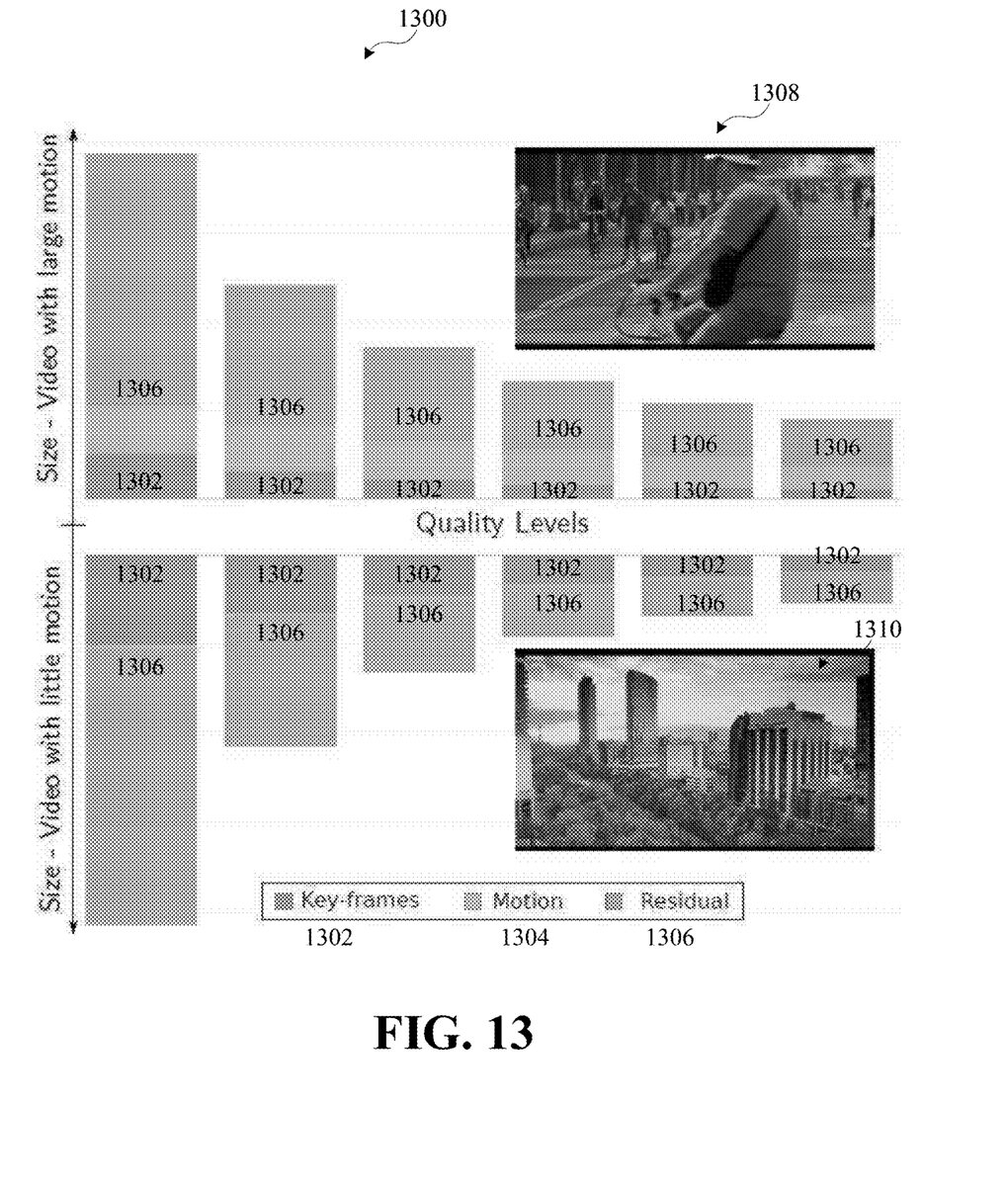
FIG. 13 illustrates bit-rate distribution, in accordance with one embodiment.

FIG. 13 illustrates bit-rate distribution, in accordance with one embodiment. Graph 1300 illustrates bit-rate distribution over different quality levels. The bottom image 1310 may correspond to a time-lapse video where very few bits are allocated to motion. The top image 1308 may correspond to a video where motion may represent about half the data for lower quality levels. As illustrated, residual data becomes more important as quality level increases. Graph 1300 illustrates the repartition of bits in terms of reference frames, residual, and motion. At lower quality levels (on the right) for the video with more motion, the motion information may be as important as the residual information. As quality level increases, the residual information becomes much more important. While motion information is not as important for the time-lapse video, the residual information becomes much more important than the reference frame information as quality level increases.

Figure 14:
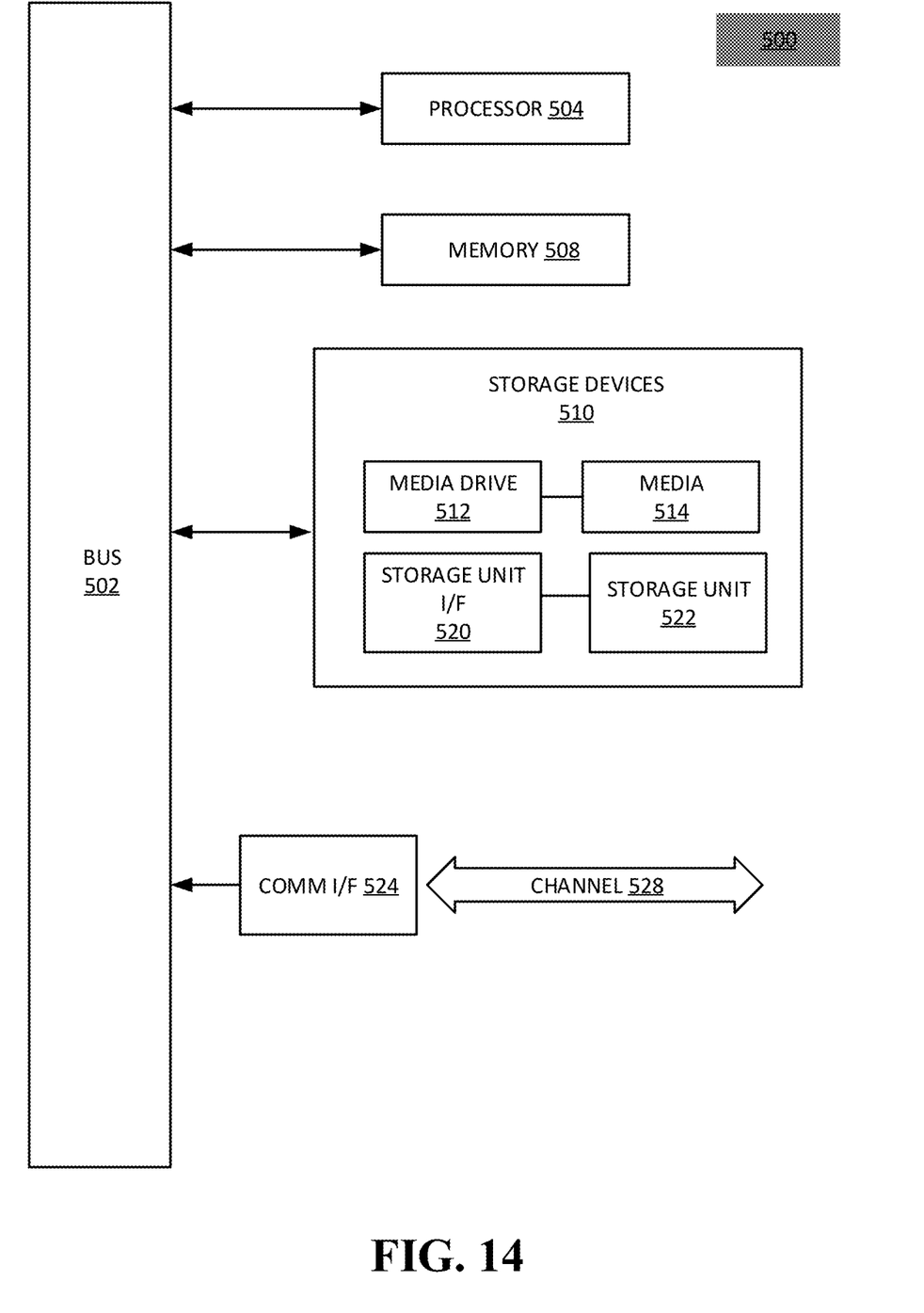
FIG. 14 illustrates an example computing component that may be used to implement features of various embodiments of the disclosure.

As used herein, the term component might describe a given unit of functionality that can be performed in accordance with one or more embodiments of the technology disclosed herein. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. As used herein, the term engine may describe a collection of components configured to perform one or more specific tasks. Even though various features or elements of functionality may be individually described or claimed as separate components or engines, one of ordinary skill in the art will understand that these features and functionality can be shared among one or more common software and hardware elements, and such description shall not require or imply that separate hardware or software components are used to implement such features or functionality.

Where engines and/or components of the technology are implemented in whole or in part using software, in one embodiment, these software elements can be implemented to operate with a computing or processing component capable of carrying out the functionality described with respect thereto. One such example computing component is shown in FIG. 14. Various embodiments are described in terms of this example-computing component 1400. After reading this description, it should be appreciated how to implement the technology using other computing components or architectures.

Referring now to FIG. 14, computing component 1400 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Computing component 1400 might also represent computing capabilities embedded within or otherwise available to a given device. For example, a computing component might be found in other electronic devices such as, for example, digital cameras, navigation systems, cellular telephones, portable computing devices, modems, routers, WAPs, terminals, and other electronic devices that might include some form of processing capability.

Computing component 1400 might include, for example, one or more processors, controllers, control components, or other processing devices, such as a processor 1404. Processor 1404 might be implemented using a general-purpose or special-purpose processing engine such as, for example, a physical computer processor, microprocessor, controller, or other control logic. In the illustrated example, processor 1404 is connected to a bus 1402, although any communication medium can be used to facilitate interaction with other components of computing component 1400 or to communicate externally.

Computing component 1400 might also include one or more memory components, simply referred to herein as main memory 1408. For example, preferably random access memory (RAM) or other dynamic memory might be used for storing information and instructions to be executed by processor 1404. Main memory 1408 might also be used for storing temporary variables or other intermediate information during execution of instructions to be executed by processor 1404. Computing component 1400 might likewise include a read-only memory ("ROM") or other static storage device coupled to bus 1402 for storing static information and instructions for processor 1404.

The computing component 1400 might also include one or more various forms of information storage device 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a CD or DVD drive (R or RW), or other removable or fixed media drive might be provided. Accordingly, storage media 1414 might include, for example, non-transient electronic storage, a hard disk, a floppy disk, magnetic tape, cartridge, optical disk, a CD or DVD, or other fixed or removable medium that is read by, written to, or accessed by media drive 1412. As these examples illustrate, the storage media 1414 can include a computer usable storage medium having stored therein computer software or data.

In alternative embodiments, information storage mechanism 1410 might include other similar instrumentalities for allowing computer programs or other instructions or data to be loaded into computing component 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory component) and memory slot, a PCMCIA slot and card, and other fixed or removable storage units 1422 and interfaces 1420 that allow software and data to be transferred from the storage unit 1422 to computing component 1400.

Computing component 1400 might also include a communications interface 1424. Communications interface 1424 might be used to allow software and data to be transferred between computing component 1400 and external devices. Examples of communications interface 1424 might include a modem or softmodem, a network interface (such as an Ethernet, network interface card, WiMedia, IEEE 802.XX, or other interface), a communications port (such as for example, a USB port, IR port, RS232 port, Bluetooth® interface, or other port), or other communications interface. Software and data transferred via communications interface 1424 might typically be carried on signals, which can be electronic, electromagnetic (which includes optical), or other signals capable of being exchanged by a given communications interface 1424. These signals might be provided to communications interface 1424 via channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium are generally referred to as "computer program code" or a "computer program product" (which may be grouped in the form of computer programs or other groupings). When executed, such instructions might enable the computing component 1400 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning, and configurations can be implemented to implement the desired features of the technology disclosed herein. Also, a multitude of different constituent component names other than those depicted herein can be applied to the various partitions. Additionally, with regard to flow diagrams, operational descriptions, and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to," or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts, and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method comprising:
    obtaining, from a non-transient electronic storage, a target frame;
    obtaining, from the non-transient electronic storage, a reconstructed frame, wherein the reconstructed frame is based on surrounding reference frames;
    encoding, with a physical computer processor, the target frame into a latent space to generate a latent space target frame;
    encoding, with the physical computer processor, the reconstructed frame into the latent space to generate a latent space reconstructed frame; and
    generating, with the physical computer processor, a latent space residual based on the latent space target frame and the latent space reconstructed frame.

2. The computer-implemented method of claim 1, further comprising decoding, with the physical computer processor, the latent space residual and the latent space reconstructed frame to generate a decoded target frame.

3. The computer-implemented method of claim 1, wherein the reconstructed frame is generated by:
    obtaining, from the non-transient electronic storage, the surrounding reference frames;
    encoding, with the physical computer processor, the surrounding reference frames;
    decoding, with the physical computer processor, the surrounding reference frames to generate one or more decoded reference frames; and
    predicting, with the physical computer processor, the reconstructed frame based on the one or more decoded reference frames.

4. The computer-implemented method of claim 1, wherein encoding the target frame and the reconstructed frame maps the target frame and the reconstructed frame from an image space to the latent space.

5. The computer-implemented method of claim 1, wherein the latent space residual and the latent space reconstructed frame are quantized in the latent space.

6. The computer-implemented method of claim 1, wherein the latent space residual and the latent space reconstructed frame are entropy coded.

7. A computer-implemented method comprising:
- obtaining, from a non-transient electronic storage, a target frame;
- obtaining, from the non-transient electronic storage, one or more reference frames surrounding the target frame;
- obtaining, from the non-transient electronic storage, an encoder and a decoder;
- applying, with a physical computer processor, the one or more reference frames to the decoder to generate one or more decoded reference frames;
- predicting, with the physical computer processor, a reconstructed frame corresponding to the target frame based on the one or more decoded reference frames,
- applying, with the physical computer processor, the target frame to the encoder to generate a latent space target frame;
- applying, with the physical computer processor, the reconstructed frame to the encoder to generate a latent space reconstructed frame; and
- generating, with the physical computer processor, a latent space residual based on the latent space target frame and the latent space reconstructed frame.

8. The computer-implemented method of claim 7, further comprising applying, with the physical computer processor, the latent space residual and the latent space reconstructed frame to the decoder to generate a decoded target frame.

9. The computer-implemented method of claim 7, wherein the encoder maps an image space to the latent space.

10. The computer-implemented method of claim 7, wherein the decoder maps the latent space to an image space.

11. The computer-implemented method of claim 7, wherein obtaining the encoder and the decoder comprises obtaining, from the non-transient electronic storage, an image transformative model, wherein the image transformative model comprises the encoder and the decoder, and wherein the image transformative model is based on a neural network.

12. The computer-implemented method of claim 7, wherein the latent space residual and the latent space reconstructed frame are quantized in the latent space.

13. The computer-implemented method of claim 7, wherein the latent space residual and the latent space reconstructed frame are entropy coded.

14. A system for generating a latent space residual, the system comprising:
- non-transient electronic storage;
- a physical computer processor configured by machine-readable instructions to:
  - obtain a target frame;
  - obtain a reconstructed frame, wherein the reconstructed frame is based on surrounding reference frames;
  - encode the target frame into a latent space to generate a latent space target frame;
  - encode the reconstructed frame into the latent space to generate a latent space reconstructed frame; and
  - generate a latent space residual based on the latent space target frame and the latent space reconstructed frame.

15. The system of claim 14, wherein the physical computer processor is further configured by machine-readable instructions to decode the latent space residual and the latent space reconstructed frame to generate a decoded target frame.

16. The system of claim 15, wherein the physical computer processor is further configured by machine-readable instructions to display, via a graphical user interface, the decoded target frame.

17. The system of claim 14, wherein the physical computer processor is further configured by machine-readable instructions to:
- obtain the surrounding reference frames;
- encode the surrounding reference frames;
- decode the surrounding frames to generate one or more decoded reference frames; and
- predict the reconstructed frame based on the one or more decoded reference frames.

18. The system of claim 14, wherein encoding the target frame and the reconstructed frame maps the target frame and the reconstructed frame from an image space to the latent space.

19. The system of claim 14, wherein the latent space residual and the latent space reconstructed frame are quantized in the latent space.

20. The system of claim 14, wherein the latent space residual and the latent space reconstructed frame are entropy coded.

* * * * *